US009769097B2

(12) United States Patent
Gatt

(10) Patent No.: US 9,769,097 B2
(45) Date of Patent: Sep. 19, 2017

(54) EXTENSIBLE CHAT ROOMS IN A HOSTED CHAT ENVIRONMENT

(71) Applicant: Multi Media, LLC, Lake Forest, CA (US)

(72) Inventor: Philip Gatt, Lake Forest, CA (US)

(73) Assignee: MULTI MEDIA, LLC, Lake Forest, CA (US)

( * ) Notice: Subject to any disclaimer, the term of this patent is extended or adjusted under 35 U.S.C. 154(b) by 272 days.

(21) Appl. No.: 14/290,937

(22) Filed: May 29, 2014

(65) Prior Publication Data

US 2015/0350128 A1    Dec. 3, 2015

(51) Int. Cl.
*H04L 12/58* (2006.01)
*G06F 3/0484* (2013.01)
*H04L 29/06* (2006.01)
*H04L 12/18* (2006.01)

(52) U.S. Cl.
CPC ........ *H04L 51/046* (2013.01); *G06F 3/04842* (2013.01); *H04L 12/1813* (2013.01); *H04L 65/403* (2013.01)

(58) Field of Classification Search
CPC . H04L 51/046; H04L 12/1813; H04L 65/403; G06F 3/04842
See application file for complete search history.

(56) References Cited

U.S. PATENT DOCUMENTS

| 6,721,713 | B1* | 4/2004 | Guheen | G06Q 99/00 705/1.1 |
| 6,823,363 | B1* | 11/2004 | Noveck | H04L 12/1813 709/204 |
| 8,539,359 | B2* | 9/2013 | Rapaport | G06Q 10/10 709/217 |
| 2010/0205541 | A1* | 8/2010 | Rapaport | G06Q 10/10 715/753 |
| 2012/0069131 | A1* | 3/2012 | Abelow | G06Q 10/067 348/14.01 |
| 2013/0097257 | A1* | 4/2013 | Jorakuji | G06F 15/16 709/206 |
| 2014/0040404 | A1* | 2/2014 | Pujare | H04L 51/04 709/206 |
| 2015/0026604 | A1* | 1/2015 | Mulukuri | G06Q 50/01 715/758 |

(Continued)

Primary Examiner — Jeffrey A Gaffin
Assistant Examiner — Mandrita Brahmachari
(74) Attorney, Agent, or Firm — Steven M. Greenberg, Esq.; CRGO Law

(57) ABSTRACT

A method for extensible chat rooms in a hosted chat environment includes providing multiple different chat rooms, each executing in a separate process address space of at least one computing device. Each of the chat rooms includes a textual transcript of chat postings and a video feed of a subject. A catalog of extensions available for provisioning in connection with the different ones of the chat rooms is displayed to different moderators of the different ones of the chat rooms. Thereafter, in response to a selection of one of the extensions by one of the moderators, the selected one of the extensions is provisioned for use in connection with processing a particular event in a corresponding one of the chat rooms. Specifically, the extension pre-processes the particular event as the particular event occurs in the chat room before permitting the chat room to process the particular event.

23 Claims, 2 Drawing Sheets

(56) References Cited

U.S. PATENT DOCUMENTS

2015/0200879 A1* 7/2015 Wu .................. H04L 51/046
                                                715/758
2015/0350128 A1* 12/2015 Gatt ................. H04L 51/046
                                                715/758

* cited by examiner ously by the chat server that
EXTENSIBLE CHAT ROOMS IN A HOSTED CHAT ENVIRONMENT

BACKGROUND OF THE INVENTION

Field of the Invention

The present invention relates to chat room management and more particularly to chat room event handling in a host chat room environment.

Description of the Related Art

A chat room refers to on-line, synchronous conferencing over a computer communications network. A chat room most commonly takes the form of a real-time interactive messaging session between a multiplicity of individuals sharing a common bounded view. The common bounded view most often is managed centrally by a chat server that processes inbound messages received from different participants to a chat session and presents those messages in the common bounded view for all of the participants to see. The modern chat room serves the primary purpose of sharing share information by way of text messages with a group of other users. Generally speaking, the ability to converse with multiple people in the same conversation differentiates chat rooms from instant messaging programs, which are more typically designed for person-to-person communication.

Chat rooms have been incorporated into wider scale computing environments that range from social networks to enterprise conferencing. Chat rooms oftentimes are topical in nature and, as such, end users in a particular chat room are generally connected via a shared interest or other similar connection. Chat rooms service a wide range of subjects, from the sublime to the risqué.

Recent advances in chat room technology incorporate more than mere textual exchanges. To wit, shared video feeds are provided, as are file transfer capabilities. Composite chat sessions integrate text with audio and video exchanges as well as file exchanges. The incorporation of such composite media finds particular application in socially topical chat session technologies. However, the utilization of composite media in a chat session is resource intensive and not accessible by the ordinary individual seeking to provide a topical chat room to a set of end users. Consequently, chat hosting services have emerged to provide a computing platform upon which individual subscribers may deploy individual chat rooms, each chat room being managed separately from other chat rooms, each chat room subsisting in isolation from other chat rooms.

Conventional chat room hosting provides a limited interface through which a subscriber can deploy a themed chat room including a video feed typically originating at a subscriber computer. More advanced chat hosting facilities permit the subscriber to moderate postings to a managed chat room. However, to fully provide a distinctive chat room experience, chat room subscribers providing a chat room in a hosted environment prefer to support a customized environment with customized chat room logic. To do so, however, requires the hosting environment to expose the underlying computing infrastructure to the programmatic flaws of the customized chat room logic. Further, to do so provides for a security exposure.

BRIEF SUMMARY OF THE INVENTION

Embodiments of the present invention address deficiencies of the art in respect to hosted chat room management and provide a novel and non-obvious method, system and computer program product for extensible chat rooms in a hosted chat environment. In an embodiment of the invention, a method for extensible chat rooms in a hosted chat environment is provided. The method includes providing multiple different chat rooms, each executing in a separate process address space of a computing device in a hosted chat room environment, each of the chat rooms including a textual transcript of chat postings and a video feed of a subject. The method also includes displaying to different moderators of different ones of the chat rooms, a catalog of extensions available for provisioning in connection with the different ones of the chat rooms. Finally, the method includes responding to a selection of one of the extensions by one of the moderators by provisioning the selected one of the extensions for use in connection with processing a particular event in a corresponding one of the chat rooms, the extension pre-processing the particular event as the particular event occurs in the chat room before permitting the chat room to process the particular event.

In another embodiment of the invention, a chat room hosting data processing system is configured for extensible chat rooms in a hosted chat environment. The system includes a hosted chat room environment that includes at least one computing device with memory and at least one processor. The system also includes multiple different chat rooms, each executing in a separate process address space of the computing device, each of the chat rooms may include a textual transcript of chat postings and a video feed of a subject. The system yet further includes one or more data stores coupled to the host chat room environment of extensions available for provisioning in connection with the different ones of the chat rooms. Finally, the system includes a chat room extension module executing in the memory of the computing device or a separate computing device. The module includes program code enabled to respond to a selection of one of the extensions by a moderator of a corresponding one of the chat rooms by provisioning the selected one of the extensions for use in connection with processing a particular event in the corresponding one of the chat rooms, the extension pre-processing the particular event as the particular event occurs in the chat room before permitting the chat room to process the particular event.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for extensible chat rooms in a hosted chat environment. In accordance with an embodiment of the invention, a hosted chat environment can be configured to host across one more computing devices, a multiplicity of chat rooms for different chat room providers. Each chat room can execute in a separate process address space in a separate thread of execution in one of the computing devices. A selection of pre-programmed event-handlers can be disposed in fixed storage of the hosted chat environment and published for selection by different ones of the chat room providers.

In response to a selection by a particular one of the providers of a particular chat room of a particular one of the pre-programmed event-handlers, the selected pre-programmed event-handler can be introduced into a process address space for the particular chat room, or in a separate process address space, and configured to trap and process a particular programmatic event occurring for the particular chat room. Further, the particular one of the pre-programmed event handler can be modified by the particular one of the providers while remaining limited in execution to the process address space of for the particular chat room or a separate, isolated event handler process address space. In this way, individual chat rooms in the hosted chat environment can be extended safely on an ad hoc basis by different chat room providers without compromising the integrity and security of the computing devices of the hosted chat environment.

Figure 1:
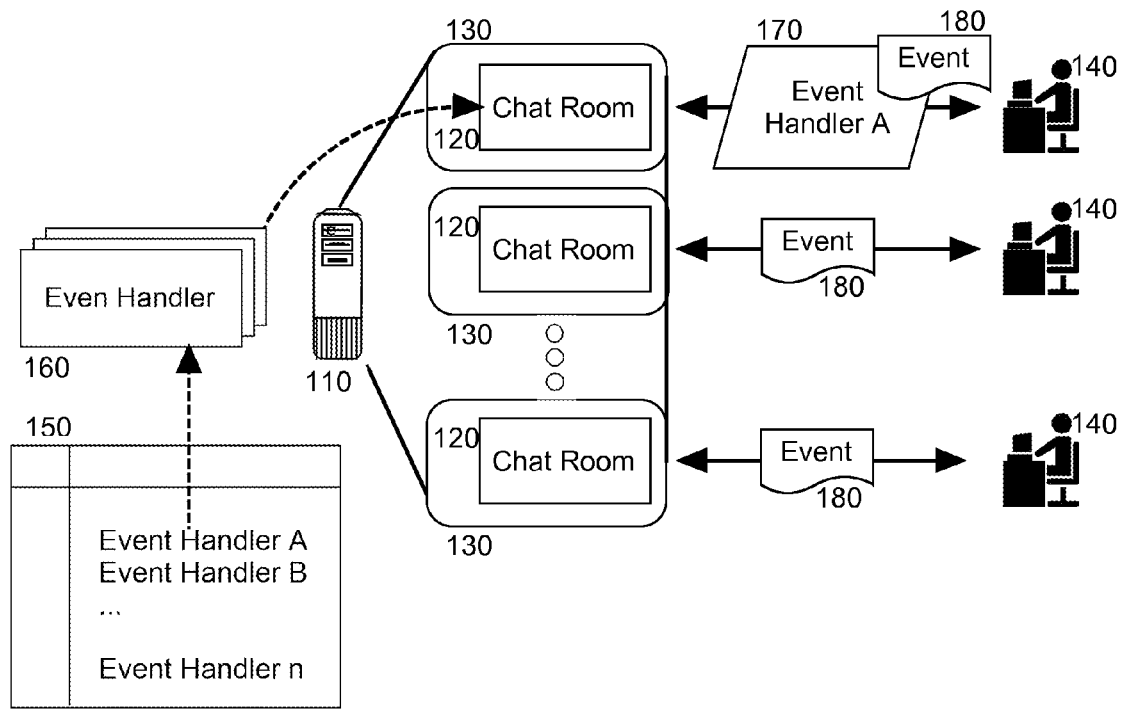
FIG. 1 is a pictorial illustration of a process for extensible chat rooms in a hosted chat environment.

In further illustration, FIG. 1 pictorially shows a process for extensible chat rooms in a hosted chat environment. As shown in FIG. 1, a hosted chat environment 110 can be provided that includes different chat rooms 120 programmatically provided in separate process address spaces 130 for use by different corresponding sets of chat room participants 140. Each of the chat rooms 120 can be provisioned on behalf of a chat room moderator (not shown) who can access a catalog 150 of extensions 160 to the chat rooms 120. The extensions 160 referenced in the catalog 150 can include program logic in the form of an event handler configured to process an event 180 occurring in a correspondingly extended one of the chat rooms 120.

In this regard, each of the extensions 160 as an event handler can be programmed to respond to a particular event 180 in a correspondingly extended one of the chat rooms 120 and, thereafter, the event handler can return the particular event 180 to the extended one of the chat rooms 120 for additional processing if any. Examples of the events 180 can include an event arising from the arrival into the extended one of the chat rooms 120 of one of the participants 140, the egress from the extended one of the chat rooms 120 of one of the participants 140, the determination of currency (virtual or actual) held by one of the participants 140, the expenditure of currency (virtual or actual) by one of the participants 140 in the extended one of the chat rooms 120, or the identification of specific text within a text message in the extended one of the chat rooms 120.

The moderator (not shown) can select one or more of the event handlers 160 for application to a moderated one of the chat rooms 120 so as to extend the moderated one of the chat rooms 120. Optionally, the moderator may modify the source code of a selected one of the event handlers 170 so as to perform custom handling of a particular one of the events 180. Thereafter, once provisioned, the selected one of the event handlers 170 can act to trap predetermined ones of the events 180 destined for the moderated one of the chat rooms 120 and to pre-process the trapped ones of the events 180 before passing the trapped ones of the events 180 to the moderated one of the chat rooms 120.

Figure 2:
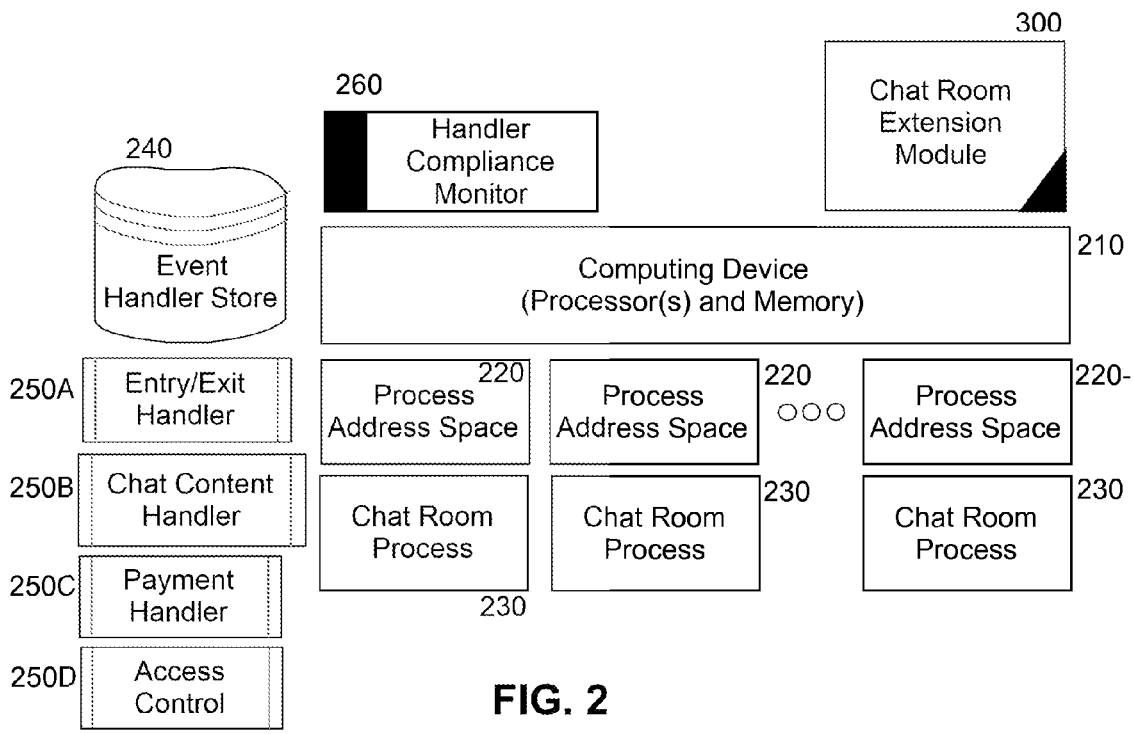
FIG. 2 is a schematic illustration of a chat room hosting data processing system configured for extensible chat rooms in a hosted chat environment; and, FIG. 3 is a flow chart illustrating a process for extensible chat rooms in a hosted chat environment.

The process described in connection with FIG. 1 can be implemented in a chat room hosting data processing system. In yet further illustration, FIG. 2 schematically shows a chat room hosting data processing system configured for extensible chat rooms in a hosted chat environment. The system can provide a hosted computing environment that includes one or more computing devices 210 (only a single device shown for the purpose of illustrative simplicity). Each computing device 210 can include one or more processors and memory. The computing device 210 further can partition the utilization of the processors and memory into separate process address spaces 220 in which correspondingly different chat room processes 230 can execute.

Each chat room process 230 can provide a visual workspace in which a video feed can be displayed of a remote subject, and a text feed of a chat transcript of the commentary of different participants to the chat. Optionally, a handler compliance monitor 260 also can execute in the memory of the computing device 210 and can monitor the performance of each chat room process 230 in a corresponding process address space 220. According to embodiments of the present invention, a handler compliance monitor 260 may execute on a separate computing device (not shown) from the computing device 210 whose process address space 220 is partitioned for use in executing the monitored chat room process 230. The monitor 260 can include a configuration to provide a view to an authorized end user of both processor and memory utilization by each of the chat room processes 230, and also the monitor 260 can direct the termination of any of the chat room processes 230 determined to have overly consumed the resources of a corresponding one of the process address spaces 220 or a process address space on a separate computing device (not shown), or to otherwise have become inoperable.

Of note, an event handler data store 240 can be coupled to the computing device 210 or stored on a separate computing device (not shown). The data store 240 can include a set of programmatic files representative of different event handlers 250A, 250B, 250C, 250D. The different event handlers 250A, 250B, 250C, 250D can include an entry/exit event handler 250A configured to respond to an event arising from the entry into a chat room of a chat room participant, the egress from a chat room of a chat room participant, or both. The different event handlers 250A, 250B, 250C, 250D also can include a chat content event handler 250B configured to respond to an event arising from the presence in chat text of a particular word, phrase or symbol. The different event handlers 250A, 250B, 250C, 250D yet further can include a payment event handler 250C. The payment event handler 250C can be configured to response to an event arising from the presence or utilization of virtual or actual currency in a chat room. The different event handlers 250A, 250B, 250C, 250D even yet further can include an access control handler 250D. The access control handler 250D can perform access control to prevent selected users from accessing a portion of a chat room, for instance by preventing a chat room participant who does not meet certain predefined criteria from viewing a video feed associated with the chat room.

A chat room extension module 300 also can execute in the memory of the computing device 210. According to embodiments of the present invention, a chat room extension module 300 may execute on a separate computing device (not shown) from the computing device 210 whose process address space 220 is partitioned for use in executing the monitored chat room process 230. The chat room extension module 300 can include program code that when executed by one or more processors of the computing device 210 or another computer device (not shown) is enabled to provision on behalf of a moderator of a particular one of the chat room processes 230, a selected one of the event handlers 250A, 250B, 250C, 25D. The selected one of the event handlers 250A, 250B, 250C, 250D can be registered by the chat room extension module 300 to receive notification of a registered event occurring in connection with particular one of the chat room processes 230. The selected one of the event handlers 250A, 250B, 250C, 250D further can be afforded by the chat room extension module 300 an opportunity to pre-process events conforming to the registered event before passing the registered event into the particular one of the chat room processes 230.

Figure 3:
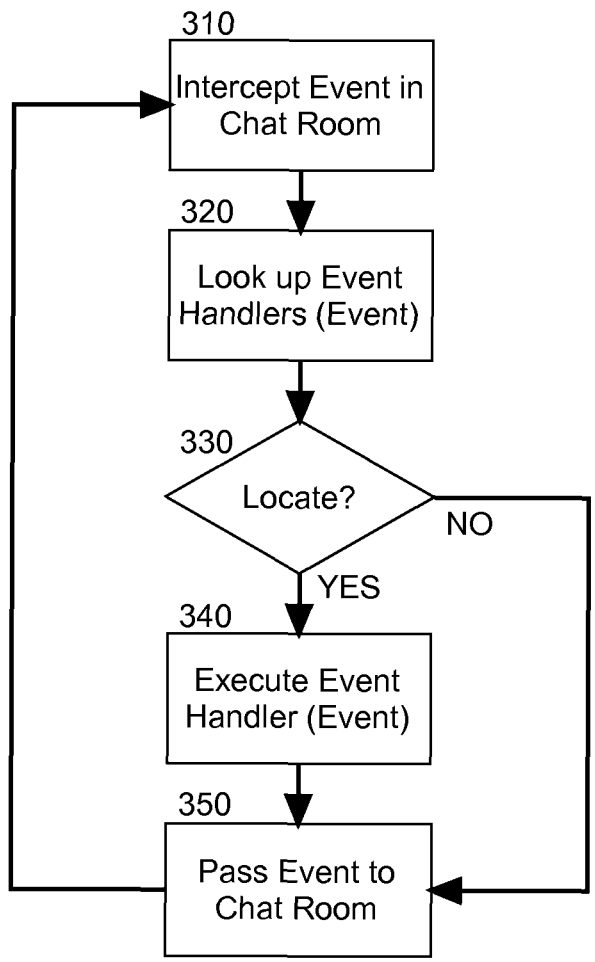

In even yet further illustration of the operation of the chat room extension module, FIG. 3 is a flow chart illustrating a process for extensible chat rooms in a hosted chat environment. Beginning in block 310, an event occurring in connection with a chat room can be intercepted (trapped) and in block 320, it can be determined whether or not any event handlers extending the chat room have been provisioned to process the trapped event. In decision block 330, if a particular event handler is located that had been provisioned to process the trapped event, the particular event handler can be invoked in block 340 to process the trapped event. Thereafter, in block 350 the trapped event can be returned to the chat room for further processing.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for extensible chat rooms in a hosted chat environment, the method comprising:
    providing multiple different chat rooms, each executing in a separate process address space of at least one computing device in a hosted chat room environment, each of the chat rooms including a textual transcript of chat postings and a video feed of a subject;
    displaying to different moderators of different ones of the chat rooms, a catalog of extensions to pre-process an event in connection with the different ones of the chat rooms;
    responsive to a selection of one of the extensions by one of the moderators, provisioning the selected one of the extensions for pre-processing a particular event in a corresponding one of the chat rooms, the extension pre-processing the particular event as the particular event occurs in the chat room before permitting the chat room to process the particular event; and
    monitoring the selected one of the extensions once provisioned in the corresponding one of the chat room and terminating execution of the selected one of the extensions based upon a monitored behavior of the selected one of the extensions.

2. The method of claim 1, wherein the monitoring comprises:
    monitoring resource utilization by the selected one of the extensions once provisioned in the corresponding one of the chat rooms; and,
    terminating execution of the selected one of the extensions in response to determining that the selected one of the extensions has consumed a threshold amount of resources.

3. The method of claim 1, wherein the monitoring comprises:
    monitoring the performance of the selected one of the extensions once provisioned in the corresponding one of the chat rooms; and,
    terminating execution of the selected one of the extension in response to determining that the selected one of the extensions has become inoperable.

4. The method of claim 1, wherein the selected one of the extensions comprises an event handler configured to pre-process an event arising from an entry of a participant to the corresponding one of the chat rooms, or an event arising from an egress of a participant from the corresponding one of the chat rooms.

5. The method of claim 1, wherein the selected one of the extensions comprises an event handler configured to pre-process an event arising from a utilization of currency in the corresponding one of the chat rooms.

6. The method of claim 1, wherein the selected one of the extensions comprises an event handler configured to pre-process an event arising from a possession of threshold amount of currency of a participant in the corresponding one of the chat rooms.

7. The method of claim 1, wherein the selected one of the extensions comprises an event handler configured to pre-process an event arising from textual content of a text posting in the corresponding one of the chat rooms.

8. The method of claim 1, wherein the selected one of the extensions comprises an access control module configured to prevent selected users from accessing a portion of the corresponding one of the chat rooms.

9. A chat room hosting data processing system configured for extensible chat rooms in a hosted chat environment, the system comprising:
    a hosted chat room environment comprising at least one computing device with memory and at least one processor;
    multiple different chat rooms, each executing in a separate process address space of the computing device, each of the chat rooms including a textual transcript of chat postings and a video feed of a subject;

a data store coupled to the host chat room environment of extensions available for provisioning in connection with the different ones of the chat rooms;

a chat room extension module executing in the memory of the at least one computing device, the module comprising program code enabled to respond to a selection of one of the extensions by a moderator of a corresponding one of the chat rooms by provisioning the selected one of the extensions for pre-processing a particular event in the corresponding one of the chat rooms, the extension pre-processing the particular event as the particular event occurs in the chat room before permitting the chat room to process the particular event; and, a handler compliance monitor monitoring the selected one of the extensions once provisioned in the corresponding one of the chat room and terminating execution of the selected one of the extensions based upon a monitored behavior of the selected one of the extensions.

10. The system of claim 9, further comprising a handler compliance monitor monitoring resource utilization by the selected one of the extensions once provisioned in the corresponding one of the chat rooms and terminating execution of the selected one of the extensions in response either to determining that the selected one of the extensions has consumed a threshold amount of resources, or to determining that the selected one of the extensions has become inoperable.

11. The system of claim 9, wherein the selected one of the extensions comprises an event handler configured to pre-process an event arising from an entry of a participant to the corresponding one of the chat rooms, or an event arising from an egress of a participant from the corresponding one of the chat rooms.

12. The system of claim 9, wherein the selected one of the extensions comprises an event handler configured to pre-process an event arising from a utilization of currency in the corresponding one of the chat rooms.

13. The system of claim 9, wherein the selected one of the extensions comprises an event handler configured to pre-process an event arising from a possession of threshold amount of currency of a participant in the corresponding one of the chat rooms.

14. The system of claim 9, wherein the selected one of the extensions comprises an event handler configured to pre-process an event arising from textual content of a text posting in the corresponding one of the chat rooms.

15. The system of claim 9, wherein the selected one of the extensions comprises an access control module configured to prevent selected users from accessing a portion of the corresponding one of the chat rooms.

16. A computer program product for extensible chat rooms in a hosted chat environment, the computer program product comprising at least one non-transitory computer readable storage medium comprising a memory device having program instructions embodied therewith, the program instructions executable by at least one computing device to cause the at least one computing device to perform a method comprising:

providing multiple different chat rooms, each executing in a separate process address space of the at least one computing device in a hosted chat room environment, each of the chat rooms including a textual transcript of chat postings and a video feed of a subject;

displaying to different moderators of different ones of the chat rooms, a catalog of extensions available for provisioning in connection with the different ones of the chat rooms;

responsive to a selection of one of the extensions by one of the moderators, provisioning the selected one of the extensions for pre-processing a particular event in a corresponding one of the chat rooms, the extension pre-processing the particular event as the particular event occurs in the chat room before permitting the chat room to process the particular event; and, monitoring the selected one of the extensions once provisioned in the corresponding one of the chat room and terminating execution of the selected one of the extensions based upon a monitored behavior of the selected one of the extensions.

17. The computer program product of claim 16, the wherein the monitoring comprises:

monitoring resource utilization by the selected one of the extensions once provisioned in the corresponding one of the chat rooms; and, terminating execution of the selected one of the extensions in response to determining that the selected one of the extensions has consumed a threshold amount of resources.

18. The computer program product of claim 16, the wherein the monitoring comprises:

monitoring the performance of the selected one of the extensions once provisioned in the corresponding one of the chat rooms; and, terminating execution of the selected one of the extension in response to determining that the selected one of the extensions has become inoperable.

19. The computer program product of claim 16, wherein the selected one of the extensions comprises an event handler configured to preprocess an event arising from an entry of a participant to the corresponding one of the chat rooms, or an event arising from an egress of a participant from the corresponding one of the chat rooms.

20. The computer program product of claim 16, wherein the selected one of the extensions comprises an event handler configured to preprocess an event arising from a utilization of currency in the corresponding one of the chat rooms.

21. The computer program product of claim 16, wherein the selected one of the extensions comprises an event handler configured to preprocess an event arising from a possession of threshold amount of currency of a participant in the corresponding one of the chat rooms.

22. The computer program product of claim 16, wherein the selected one of the extensions comprises an event handler configured to preprocess an event arising from textual content of a text posting in the corresponding one of the chat rooms.

23. The computer program product of claim 16, wherein the selected one of the extensions comprises an access control module configured to prevent selected users from accessing a portion of the corresponding one of the chat rooms.

* * * * *